Figure 1:
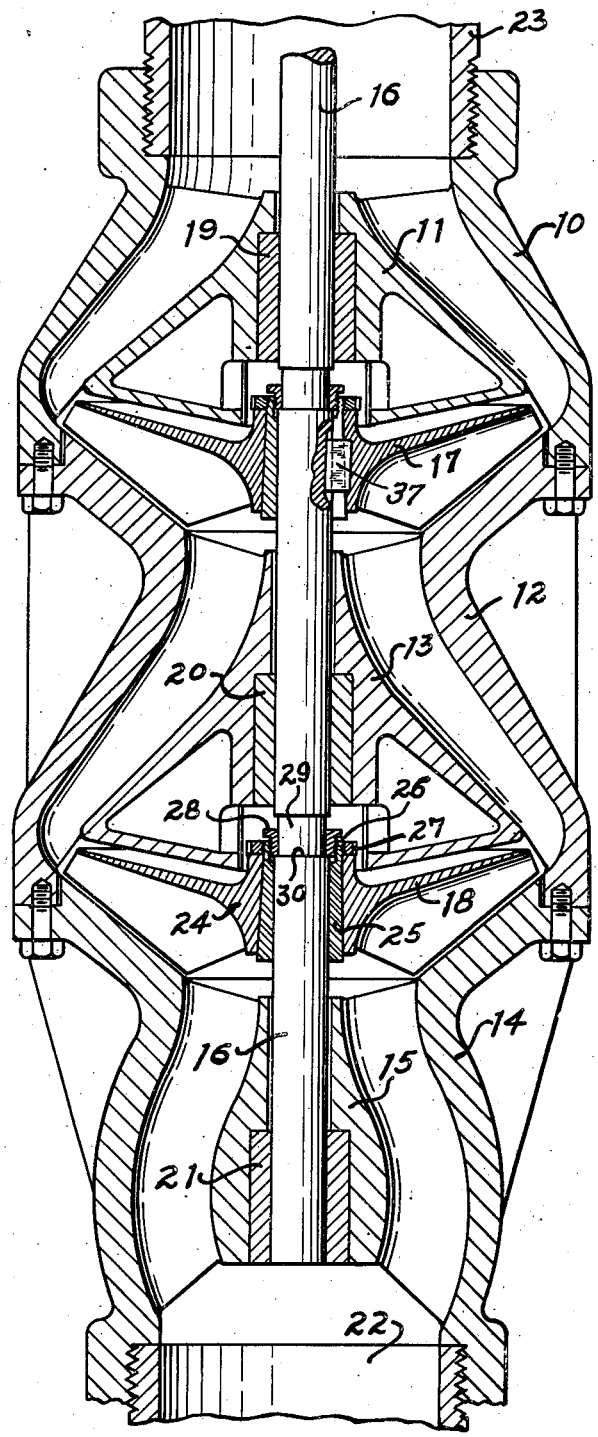

Sept. 10, 1946.  R. D. SCHOTT  2,407,348
IMPELLER MOUNTING
Filed Dec. 22, 1943

INVENTOR.
RUDOLPH D. SCHOTT.
BY
Wm. H. Atkinson
ATTORNEY.

Patented Sept. 10, 1946

2,407,348

UNITED STATES PATENT OFFICE 2,407,348

IMPELLER MOUNTING

Rudolph D. Schott, Los Gatos, Calif., assignor, by mesne assignments, to Fairbanks, Morse & Co., a corporation of Illinois Application December 22, 1943, Serial No. 515,201

9 Claims. (Cl. 287—52.06)

My present invention relates to centrifugal or impeller-type pumps, and more particularly to an improved means for adjusting and firmly securing the impellers and/or propellers of such a pump upon a driving shaft.

An object of the invention is to provide a simple, practical and effective means for securing an impeller or propeller of a centrifugal or rotary pump upon its driving shaft.

Another object of the invention is to provide an improvement in connection with a tapering sleeve-type of mounting for rotary impellers by which the position of the tapering sleeve may be adjusted and held in a fixed position upon the impeller driving shaft.

Another object of the invention is to provide a positively acting means for positioning the mounting sleeves of a number of impellers or propellers upon a driving shaft in such a manner that the impellers and/or propellers will be spaced in proper clearance relation with adjacent cooperating surfaces when moved upon the sleeve to produce the friction necessary to provide the holding fit required.

Another object of the invention is to provide a means for mounting impellers and/or propellers of a centrifugal pump upon a common shaft, which will permit of adjustment where it is impossible to predetermine their exact positions upon the shaft prior to their final assembly.

It has heretofore been common practice, in the construction of centrifugal pumps, and more especially in the vertical turbine and impeller pumps having multiple stages, to fasten or position each of the impellers by means of a split bushing which is externally threaded to receive a nut that serves to move the impeller along the outside tapered surface of the bushing to thereby tighten the bushing upon the shaft and grip the shaft to thus produce a frictional driving connection between the shaft, bushing and impeller as the nut is turned upon the split and tapered bushing. Such an arrangement is shown in my prior Patent No. 2,273,420, issued February 17, 1942 and entitled Centrifugal pump. With this prior arrangement it will be obvious that the amount of torque that can be transmitted from the shaft to the impeller will be dependent not only upon the amount of contact between the parts, but also upon the character of the contact surfaces between the several parts. In most pumps of this type it is also important that the axial position of the impeller upon its driving shaft be rigidly maintained with reference to the fluid directing shroud or bowl with which the impeller is associated. For example, in centrifugal pumps of the impeller type, which have impellers of the semi-open type that rotate in close proximity to stationary parts, the clearances must necessarily be very small and, therefore, it is a further object of my invention to provide a means which will permit of a close adjustment in the position of the impellers with respect to each other upon the shaft and thus meet the above requirements in a novel and efficient manner.

Other objects and advantages of the invention will be in part evident to those skilled in the art and in part pointed out hereinafter in the following description taken in connection with the accompanying drawing, wherein there is shown by way of illustration and not of limitation preferred embodiments thereof.

Figure 2:
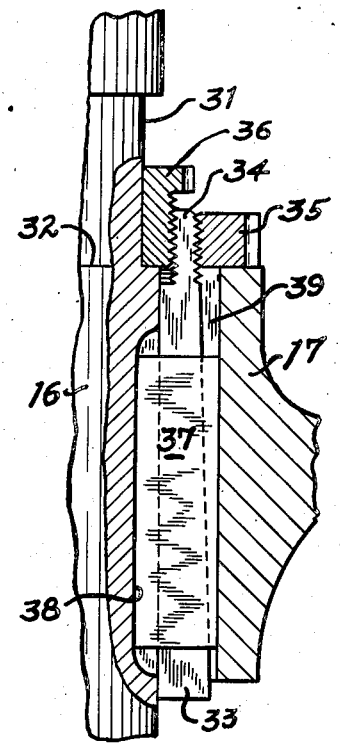
Figure 3:
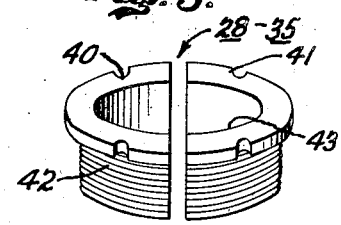

In the drawing:

Figure 1 is a vertical sectional view showing two forms which the invention may take, Figure 2 is an enlarged fragmentary view showing details of one of the forms of the invention illustrated in Figure 1 of the drawing, and Figure 3 is a perspective view showing details of one of the parts.

For the purpose of illustrating and describing my present invention, I have, in Figure 1 of the drawing, shown a pumping unit comprising an upper shroud or bowl-like member 10 having an internal shroud 11 between which vertical fluid circulating conduits are formed. Immediately below the shroud or bowl-like member 10 there is a second shroud or bowl-like member 12 having an internal shroud 13 which likewise forms other fluid directing columns, and below the shroud or bowl-like member 12 there is an intake shroud or bowl 14 which has a centrally disposed bearing hub 15. Extending through the shrouds 11, 13 and the bearing hub 15 there is an impeller driving shaft 16 upon which impellers 17 and 18 are mounted. The shaft 16 is also here shown as journaled in water lubricated bearings 19, 20 and 21 which are respectively carried by the shrouds 11 and 13 and the bearing hub 15. Extending downwardly from the intake shroud or bowl 14 there is an intake pipe 22, and extending upwardly from the shroud or bowl-like member 10 there is a discharge pipe 23. As is well understood in the art, the unit above described may constitute a complete pumping unit, or a number of these units may be mounted in end to end relationship to form any desired number of stages depending upon the pumping head.

Except for the rotatable driving shaft 16 and the impellers 17 and 18, the above described parts constitute the principal stationary portions of the pumping unit. As suggested above, these parts provide fluid directing conduits through which the fluid is directed upwardly from the rotary elements or impellers 17 and 18. In Figure 1 the impeller 17 is shown as secured to the driving shaft 16 by means of a preferred arrangement that will be described in greater detail in connection with Figure 2 of the drawing. However, before describing this embodiment, attention is directed to the manner in which the impeller 18 is secured upon the driving shaft 16. At this point it will be noted that the impeller 18 has a central hub 24 which has an internally tapered bore that is adapted to fit over the tapered external surface of a split sleeve 25. This split sleeve 25 has an externally and internally threaded end 26 with which two threaded members 27 and 28 cooperate. As here shown, the threaded member 27 is in the form of a fluted or crown nut which is threaded upon the external threads of the sleeve 25 so as to force the hub 24 of the impeller 18 downwardly thereover and in tight clamping relation thereupon. At this point it will also be noted that the threaded member 28, which it should be explained is formed in two complementary halves, is seated in an undercut portion 29 and abuts upon a shoulder 30 thus formed upon the driving shaft 16. With this arrangement it will be readily seen that when the threaded member 28 is properly adjusted and in abutment with the shoulder 30 upon the shaft 16, it will serve to hold the tapered sleeve 25 against any downward axial movement upon the shaft 16 during the final tightening of the crown or fluted nut 27, and after the assembly operations are completed, the impeller will be firmly held against any downward displacement upon the shaft 16.

Reference is now made to Figure 2 of the drawing for a more detailed description of the manner in which the impeller 17 is secured upon the driving shaft 16. As here shown, the driving shaft 16 is also provided with an undercut portion 31 which will form a shoulder 32 and, like the previously described arrangement, there is a split externally tapered sleeve 33 having an externally and internally threaded end 34 with which threaded members 35 and 36 cooperate, as above described. In addition to these means, this embodiment of the invention contemplates the provision of a further securing means in the form of a relatively flat key 37 that is seated in a keyway 38 formed in the driving shaft 16 and extends between the split forming ends of the externally tapered sleeve 33 and into engagement with a keyway 39 formed in the hub of the impeller 17. The provision of this additional means will insure against any relative circumferential displacement between the parts during the assembly operation, as when the threaded members 35 and 36 are being turned into their final positions, and will also serve to supplement the frictional driving connection between the shaft and sleeve and the tapered hub of the impeller. As a modification of this form of mounting, it will be understood that, if desired, two separate keys may be substituted for the key 37 by forming complementary keyways in the tapered sleeve 33 which will permit the use of one key between the shaft 16 and the inside of the tapered sleeve 33, and another key between the tapered outside surface of the sleeve 33 and the hub of the impeller 17.

As shown in Figure 3 of the drawing, the threaded members 28 and 36 described above may be in the form of split externally threaded nuts having two similar parts 40 and 41 with matching threads 42 and providing a cylindrical bore 43 extending therethrough for the shaft 16 when the parts are assembled together upon the shaft.

While I have, for the sake of clearness and in order to disclose the invention so that the same can be readily understood, described and illustrated a particular arrangement, I desire to have it understood that the invention is not limited to the specific form disclosed, but may be embodied in other ways that will suggest themselves to persons skilled in the art. It is believed that this invention is new and all such changes as come within the scope of the appended claims are to be considered as part of this invention.

Having thus described my invention, what I claim and desire to secure by Leters Patent is:

1. In a device of the character described, the combination of a cylindrical shaft, a split cylindrical bushing having a tapered external surface adapted to be clamped upon said shaft, a member having a hub with a tapered bore mounted upon said bushing, means operating to force the hub of said member into clamping relation upon said bushing, and means fixed against axial movement carried by said shaft and engaging said bushing for retaining said bushing in any desired axial position upon said shaft.

2. In a device of the character described, the combination of a cylindrical shaft having an annular shoulder extending thereabout, a cylindrical bushing having a tapering external surface threaded at its smaller end, said bushing being also internally threaded at its smaller end where it is adapted to extend over the shoulder formed upon said shaft, a member having a corresponding internally tapered portion mounted upon said bushing, threaded means engaging the threads upon the external surface of said cylindrical bushing operating to force said member into tight fitting engagement with said bushing, and threaded means engaging the internal threads of said bushing and the annular shoulder of said shaft for securing said bushing against axial displacement upon said shaft.

3. In a device of the character described, the combination of a cylindrical shaft having means forming a shoulder thereabout, means forming a tapering external surface about said shaft and having external screw threads at its smaller end, said last named means also having an internally threaded portion adapted to extend over said shoulder forming means, a member mounted upon said bushing, threaded means engaging the external threads upon the means forming the tapering external surface about said shaft operating to hold said member in tight fitting engagement with said external surface forming means, and threaded means engaging the means forming said shoulder and the internally threaded portion of said tapering external surface forming means for adjustably securing said tapering external surface forming means in any desired axial position upon said shaft.

4. In a device of the character described, the combination of a cylindrical shaft having an annular recess extending thereabout, a split cylindrical bushing adapted to surround said shaft and having a tapering external surface, said bushing being internally threaded and adapted to extend over the recess in said shaft, an impeller having a hub with a correspondingly tapered bore adapted to be mounted upon said bushing, and threaded means of at least two parts positioned in the annular recess of said shaft and engaging the internal threads of said bushing for adjustably securing said bushing in any desired axial position with respect to the recess in said shaft.

5. In a device of the character described, the combination of a cylindrical shaft having a shoulder extending thereabout, a split cylindrical bushing adapted to surround said shaft and having a tapering external surface, said bushing being internally threaded and adapted to extend over the shoulder extending about said shaft, an impeller having a hub with a correspondingly tapered bore adapted to be mounted upon said bushing, and an externally threaded nut formed in two parts positioned against said shoulder and engaging the internal threads of said bushing for adjustably securing said bushing in any desired axial position with respect to the shoulder upon said shaft.

6. In a device of the character described, the combination of an impeller driving shaft having a portion forming a shoulder thereupon and an axially extending keyway therebelow, a split cylindrical bushing having a tapering external impeller hub supporting surface, said bushing being internally threaded at its smaller end and adapted to extend over the shoulder formed upon said shaft, a key disposed in the keyway of said shaft and extending between the split forming ends of said cylindrical bushing, an impeller having a keyway engaging said key and mounted upon said bushing, and threaded means cooperating with said shoulder and the internal threads of said bushing for axially adjusting said bushing independently of said key to any desired position with respect to the shoulder upon said shaft.

7. In a device of the character described, the combination of an impeller driving shaft having an annular recess cut thereabout and an axially extending keyway cut therebelow, a split cylindrical bushing having an externally tapering impeller hub supporting surface with a threaded extension at its smaller end, said bushing being also internally threaded within said extension and adapted to extend over the recess cut in said shaft, a key disposed in the keyway of said shaft and extending between the split forming ends of said cylindrical bushing, an impeller having an internally tapered hub and a keyway engaging said key mounted upon said bushing, threaded means engaging the external threads of said cylindrical bushing operating to force said impeller hub into tight fitting engagement with said bushing, and an externally threaded means disposed in said recess and engaging the internal threads of said bushing for adjustably securing said bushing in any desired axial position prior to a tightening of said threaded means upon the external threads of said bushing, all whereby the ultimate position of said impeller upon the shaft may be accurately determined.

8. In a device of the character described, the combination of a driving shaft having a recess extending thereabout, an externally tapered compressible bushing means adapted to be clamped upon said driving shaft, an impeller having a tapered bore adapted to be moved axially over said bushing to exert a clamping force thereupon, whereby the impeller will be frictionally secured upon said driving shaft, and means carried by said bushing and engaging the recess in said shaft for retaining said bushing in a predetermined axial position upon said driving shaft.

9. In a device of the character described, the combination of a driving shaft having a shoulder formed thereupon, an externally tapered compressible bushing means adapted to be clamped upon said driving shaft, an impeller having a tapered bore adapted to be moved axially over said bushing to exert a clamping force thereupon, whereby the impeller will be frictionally secured upon said driving shaft, and adjustable means carried by said bushing and engaging the shoulder upon said shaft for retaining said bushing in any desired axial position upon said driving shaft.

RUDOLPH D. SCHOTT.